US012366338B2

(12) United States Patent
Imamura et al.

(10) Patent No.: US 12,366,338 B2
(45) Date of Patent: Jul. 22, 2025

(54) VEHICLE LAMP

(71) Applicant: Ichikoh Industries, Ltd., Isehara (JP)

(72) Inventors: Hiroya Imamura, Isehara (JP); Yuji Ohashi, Isehara (JP); Eiji Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/574,087

(22) PCT Filed: Jun. 29, 2022

(86) PCT No.: PCT/JP2022/025991
§ 371 (c)(1),
(2) Date: Dec. 26, 2023

(87) PCT Pub. No.: WO2023/277071
PCT Pub. Date: Jan. 5, 2023

(65) Prior Publication Data

US 2024/0360970 A1 Oct. 31, 2024

(30) Foreign Application Priority Data

Jun. 30, 2021 (JP) ................................ 2021-108538

(51) Int. Cl.
*F21S 41/265* (2018.01)
*F21S 41/255* (2018.01)
(Continued)

(52) U.S. Cl.
CPC ........... *F21S 41/265* (2018.01); *F21S 41/255* (2018.01); *F21S 41/321* (2018.01); *F21S 41/365* (2018.01);
(Continued)

(58) Field of Classification Search
CPC ...... F21S 41/265; F21S 41/255; F21S 41/321; F21S 41/365; F21S 41/663; F21W 2102/13
See application file for complete search history.

(56) References Cited

U.S. PATENT DOCUMENTS

2016/0238206 A1 8/2016 Honda et al.
2017/0158113 A1* 6/2017 Kanayama ............ F21S 41/255
(Continued)

FOREIGN PATENT DOCUMENTS

JP 2007-109493 A 4/2007
JP 2007324002 A 12/2007
(Continued)

OTHER PUBLICATIONS

Office Action issued Jul. 23, 2024, in corresponding Japanese Patent Application No. 2021-108538 (with English Translation), 8 pages.
(Continued)

*Primary Examiner* — Erin Kryukova
(74) *Attorney, Agent, or Firm* — Oblon, McClelland, Maier & Neustadt, L.L.P.

(57) ABSTRACT

Provided is a vehicle lamp which forms a travel light distribution pattern in which occurrence of a dark area between low and high beam light distributions is suppressed. A projection lens is divided into a plurality of lens areas, each of which has a different focal point position, and one second lens area is a low lens area. A low beam light source module is set such reflected light from the reflector is incident on a back surface of the second lens area, and a low beam light distribution is emitted from an area front surface. A high beam light source module is set such that emitted light from a high beam light source is directly incident on a lens back surface of the projection lens, and a high beam light distribution for each area is emitted from each of a plurality of area front surfaces.

16 Claims, 6 Drawing Sheets

(51) Int. Cl.

| | |
|---|---|
| ***F21S 41/32*** | (2018.01) |
| ***F21S 41/365*** | (2018.01) |
| ***F21S 41/663*** | (2018.01) |
| ***F21W 102/13*** | (2018.01) |

(52) U.S. Cl.

CPC ........ *F21S 41/663* (2018.01); *F21W 2102/13* (2018.01)

(56) References Cited

U.S. PATENT DOCUMENTS

| | | | | |
|---|---|---|---|---|
| 2017/0227184 | A1* | 8/2017 | Ishida | F21S 41/60 |
| 2017/0299137 | A1* | 10/2017 | Kinoshita | F21S 41/147 |
| 2017/0343173 | A1* | 11/2017 | Takada | F21S 41/321 |

FOREIGN PATENT DOCUMENTS

| | | | |
|---|---|---|---|
| JP | 2017-103189 | A | 6/2017 |
| JP | 2019-96484 | A | 6/2019 |
| WO | WO 2018/003888 | A1 | 1/2018 |

OTHER PUBLICATIONS

International Search Report issued Aug. 30, 2022 in PCT/JP2022/025991, filed on Jun. 29, 2022, 2 pages.

European Search Report issued Jun. 5, 2025, in European Application No. 22833217.7.

* cited by examiner

VEHICLE LAMP

TECHNICAL FIELD

The present disclosure relates to a vehicle lamp.

BACKGROUND ART

As a conventional vehicle lamp that obtains a good light distribution pattern, a vehicle lamp that includes a first reflective part and a second reflective part is known. The first reflective part includes a first stepped surface that forms a cutoff line, a second stepped surface, and an inclined surface, and has a stepped part where a front end of the second stepped surface protrudes forward with respect to a front end of the first stepped surface. The second reflective part has a continuous surface without the stepped part below the stepped part of an upper end where the second stepped surface protrudes forward with respect to the first stepped surface (see PTL 1, for example).

CITATION LIST

Patent Literature

PTL 1: Japanese Patent Application Publication No. 2019-96484

SUMMARY OF THE INVENTION

Problems to be Solved by the Invention

The conventional vehicle lamp includes a low beam light source, a high beam light source, and a projection lens. Focusing on reflective members that partially reflect light from the low beam light source to create a cutoff line, a high beam light distribution pattern that partially overlaps with the cutoff line of a low beam light distribution pattern is formed. However, when there is an assembly error in the two light sources (low beam and high beam light sources) or a shade, the high beam light distribution pattern that does not overlap with the cutoff line of the low beam light distribution pattern may be formed. When the cutoff line and the high beam light distribution pattern do not overlap with each other, a dark area (an area where the illumination intensity is lower than that in the surrounding area) occurs between the cutoff line of the upper end of the low beam light distribution pattern and the lower end of the high beam light distribution pattern, and there is room for improvement.

The present disclosure has been made focusing on the above problem, and an object of the present disclosure is to provide a vehicle lamp with a projection lens shared by two light sources, the vehicle lamp forming a travel light distribution pattern in which occurrence of a dark area between a low beam light distribution and a high beam light distribution is suppressed.

Means for Solving the Problem

In order to achieve the above object, a vehicle lamp of the present disclosure includes a projection lens, a low beam light source module, and a high beam light source module. The projection lens is divided into a plurality of lens areas, each of which has a different focal point position, and one of the plurality of lens areas is a low lens area with a low focal point. The low beam light source module has a low beam light source and a reflector, and is set such that reflected light from the reflector which reflects emitted light from the low beam light source is incident on a back surface of the low lens area, and a low beam light distribution is emitted from an area front surface. The high beam light source module has a high beam light source, and is set such that emitted light from the high beam light source is directly incident on a lens back surface of the projection lens, and a high beam light distribution for each area is emitted from each of a plurality of area front surfaces.

Effect of the Invention

Accordingly, it is possible to provide a vehicle lamp with a projection lens shared by two light sources, the vehicle lamp forming a travel light distribution pattern in which occurrence of a dark area between a low beam light distribution and a high beam light distribution is suppressed.

MODE FOR CARRYING OUT THE INVENTION

Figure 1:
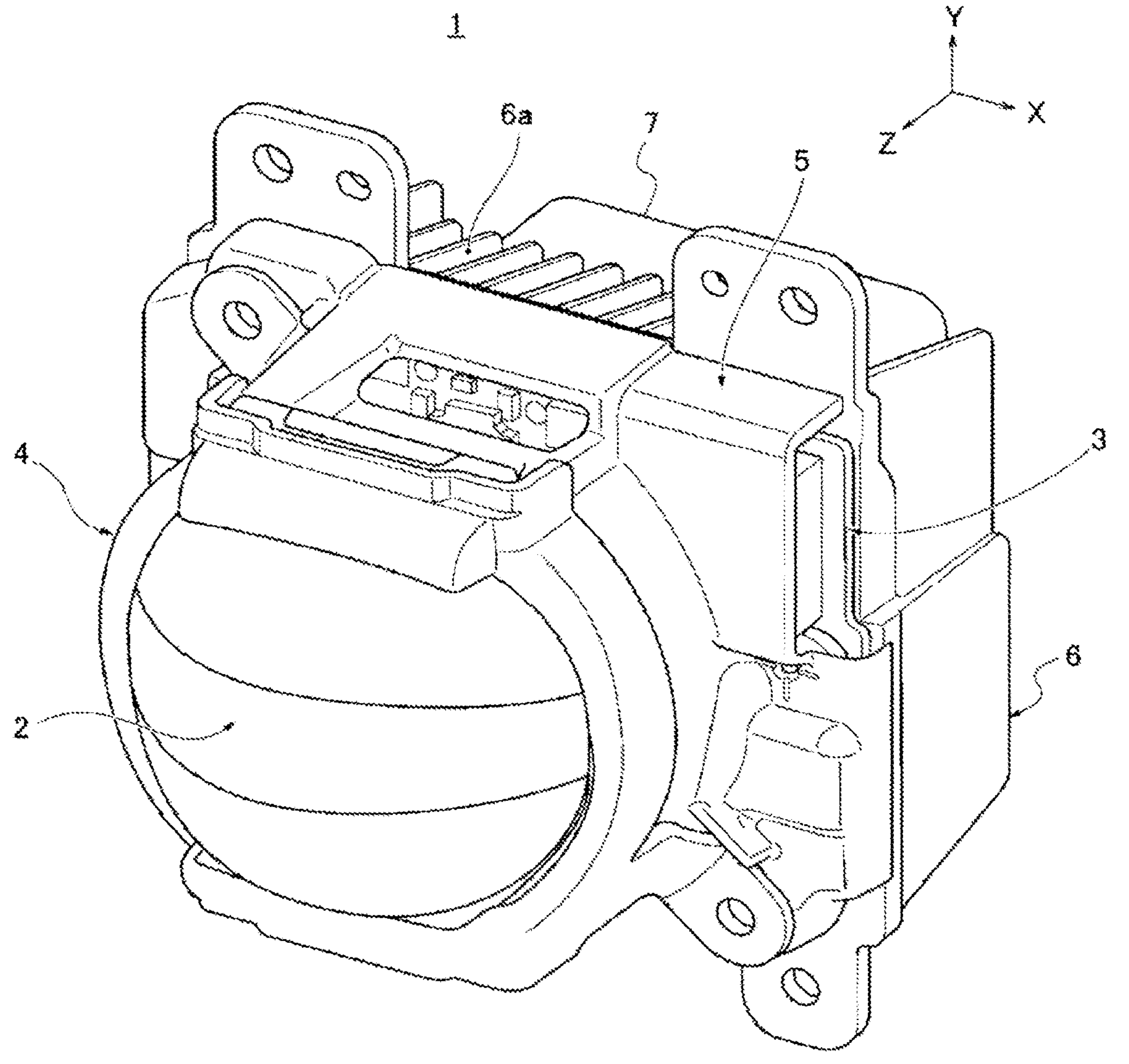
FIG. 1 is a perspective view illustrating an overall configuration of a headlight unit of a first embodiment.

Modes for carrying out a vehicle lamp according to the present disclosure will be described on the basis of a first embodiment and a second embodiment illustrated in the drawings.

First Embodiment

The first embodiment will be described on the basis of an example in which a vehicle lamp is applied to a headlight unit (example of a vehicle lamp) disposed on both the left and right sides of a front part of a vehicle and including one projection lens, a low beam light source module, and a high beam light source module. In the following description, in the headlight unit, the traveling direction in which the vehicle travels straight ahead and light is projected is defined as the optical axis direction (Z in the drawing), the direction that represents up and down in a state in which the headlight unit is mounted on the vehicle is defined as the vertical direction (Y in the drawing), and the direction orthogonal to the optical axis direction and the up and down direction is defined as the width direction (X in the drawing).

Now, a configuration of a headlight unit 1 will be described with reference to FIG. 1 and FIG. 2.

As illustrated in FIG. 1, the headlight unit 1 includes a projection lens 2, a substrate 3, a first holder 4, a second holder 5, a heat sink member 6, and a fan 7.

The projection lens 2 is mounted on the substrate 3 or the heat sink member 6 via the first holder 4 and the second holder 5. The first holder 4 positions and holds an outer circumference of the projection lens 2 and is fixed to the second holder 5 in the lens holding state. The second holder 5 is fixed to the substrate 3 or the heat sink member 6.

The substrate 3 is disposed behind the projection lens 2, and a low beam light source 80 and a high beam light source 90 described below are provided at a front surface position facing the projection lens 2. The heat sink member 6 is fixed at a back surface position of the substrate 3. The heat sink member 6 has a heat radiating fins 6*a*.

The fan 7 is located at a rear surface position of the heat sink member 6 to promote heat radiation by the heat sink member 6. A power connector, not illustrated, is connected to the front side of the headlight unit 1 to enable electrical connection between the on-vehicle power supply and the low beam light source 80 and between the on-vehicle power supply and the high beam light source 90. For example, during traveling in which a travel light distribution pattern (=high beam light distribution pattern+low beam light distribution pattern) is manually or automatically selected, a lighting current is supplied to turn on the low beam light source 80 and high beam light source 90 simultaneously. When a passing light distribution pattern (=low beam light distribution pattern) is manually or automatically selected while traveling in the travel light pattern, the lighting current to the high beam light source 90 is cut off (turned off) and only the lighting current to the low beam light source 80 is supplied.

Figure 2:
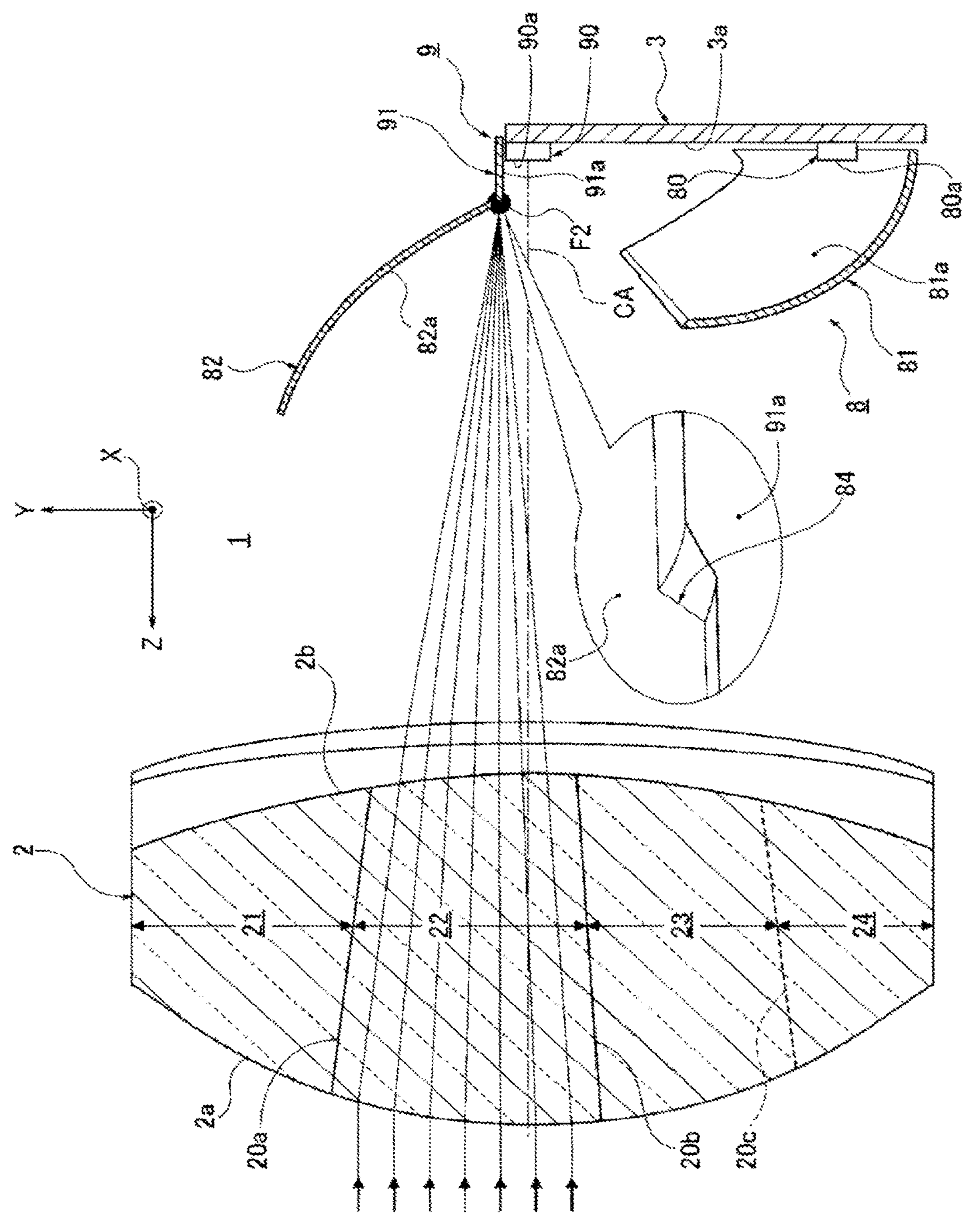
FIG. 2 is a longitudinal sectional view illustrating configurations of a projection lens, a low beam light source module, and a high beam light source module of the headlight unit of the first embodiment.

As illustrated in FIG. 2, the headlight unit 1 includes the projection lens 2, a low beam light source module 8, and a high beam light source module 9.

The projection lens 2 is a single optical lens shared by two light sources, namely, the low beam light source 80 and the high beam light source 90. The projection lens 2 is divided into a plurality of lens areas 21, 22, 23 and 24, each of which has a different focal point position where parallel light incident from a lens front surface 2*a* is converged. The projection lens 2 is formed of transparent acrylic resin or the like. Each of the lens areas 21, 22, 23 and 24 of the projection lens 2 continuously changes the curvature of each of a front surface and a back surface, so that the lens front surface 2*a* and the lens back surface 2*b* each have a smoothly connected curved surface with no difference in shape.

The projection lens 2 is divided into four areas, namely, the first lens area 21, the second lens area 22, the third lens area 23, and the fourth lens area 24 from the upper side to the lower side as a plurality of high lens areas where emitted light emitted from the high beam light source 90 is directly incident. A position where the first lens area 21 and the second lens area 22 are divided is defined as a first area boundary 20*a*. A position where the second lens area 22 and the third lens area 23 are divided is defined as a second area boundary 20*b*. A position where the third lens area 23 and the fourth lens area 24 are divided is defined as a third area boundary 20*c*.

Herein, the first embodiment illustrates an example in which a single optical lens is configured as the projection lens 2 by an integrated lens divided into four lens areas. However, the projection lens may be composed of a combination lens in which a plurality of lens components corresponding to lens areas are joined together to form a projection lens. In the case of the integrated lens, a lens front surface may be a smooth surface and a lens back surface may be configured with a stepped surface for each lens area. Furthermore, a vertically striped prism to diffuse light beams from a low beam light source and a high beam light source to the left and the right may be formed on the lens front surface of the projection lens.

Emitted light from the high beam light source 90 is directly incident on an area back surface of the first lens area 21. Then, light beams emitted outward from an area front surface of the first lens area 21 form a center light distribution HP1 of a high beam light distribution pattern HP (see a 1st light distribution of FIG. 4). Herein, the focal point position of the first lens area 21 is designed such that the center light distribution HP1 has such a shape as to overlap a cutoff line CL at an upper end of a low beam light distribution pattern LP.

The second lens area 22 is interposed between the first lens area 21 and the third lens area 23 and is defined as a low lens area with a low focal point F2 where parallel light incident from the lens front surface 2*a* is converged. Herein, a position of the low focal point F2 of the second lens area 22 is designed such that the low beam light distribution pattern LP with the cutoff line CL is formed at such an appropriate position as to partially overlap the high beam light distribution pattern HP. The second lens area 22 is disposed at a position where a lens optical axis center line CA of the projection lens 2 passes through.

Emitted light from the low beam light source 80 is reflected by a first reflector 81 and a second reflector 82, and reflected light from the second reflector 82 is incident on an area back surface of the second lens area 22. At this time, reflected light from the first reflector 81 forms the cutoff line CL by shape setting of a reflective surface 82*a* of the second reflector 82. Then, light beams emitted outward from the area front surface of the second lens area 22 forms the low beam light distribution pattern LP with the cutoff line CL (see a 2nd light distribution of FIG. 4).

The emitted light from the high beam light source 90 is directly incident on the area back surface of the second lens area 22. Then, light beams emitted outward from the area front surface of the second lens area 22 form an upper part light distribution HP2 that is tangent to a horizontal line H of the high beam light distribution pattern HP (see the 2nd light distribution of FIG. 4).

When the light from the high beam light source 90 is partially reflected by a reflective surface 91*a* of a reflective member 91, the reflected light is incident on the area back surface of the second lens area 22. Then, the light beams emitted outward from the area front surface of the second lens area 22 form an additional light distribution HP2' of the high beam light distribution pattern HP that is tangent to the cutoff line CL of the low beam light distribution pattern LP (see a 2 nd light distribution of FIG. 4).

The emitted light from the high beam light source 90 is directly incident on an area back surface of the third lens area 23. Then, light beams emitted outward from an area front surface of the third lens area 23 form a center light distribution HP3 of the high beam light distribution pattern HP (see a 3rd light distribution of FIG. 4). Herein, the focal point position of the third lens area 23 is designed such that the center light distribution HP3 has such a shape as to overlap the cutoff line CL at the upper end of a low beam light distribution pattern LP.

The emitted light from the high beam light source 90 is directly incident on an area back surface of the fourth lens area 24. Then, light beams emitted outward from an area front surface of the fourth lens area 24 form an upper light distribution HP4 of the high beam light distribution pattern HP (see a 4th light distribution of FIG. 4). Herein, the fourth lens area 24 does not have a specific focus, and the shape of the upper light distribution HP4 is designed so as to expand the shape of the high beam light distribution pattern HP by combination of the other lens areas 21, 22, and 23 toward the upper side.

The low beam light source module 8 is a light source-side module that forms the low beam light distribution pattern LP with the cutoff line CL by using the second lens area 22 of the projection lens 2. The low beam light source module 8 has the low beam light source 80, the first reflector 81 (reflector), and the second reflector 82 (reflector).

The low beam light source 80 is disposed to face the projection lens 2, and provided on the substrate 3 having a lens facing surface 3*a*. Herein, the "disposed to face" means to be disposed such that a surface orthogonal to the lens optical axis of the projection lens 2 and facing the lens back surface 2*b* is a light emitting surface 80*a* of the low beam light source 80. In other words, the low beam light source 80 is located below the high beam light source 90 and provided on the same plane as the lens facing surface 3*a* where the high beam light source 90 is provided. As the low beam light source 80, for example, a self-luminous semiconductor light source such as an LED and an EL (organic EL), that is, a semiconductor type light source (LED in the embodiment) is used. The low beam light source 80 has one or more light emitting chips provided on the lens facing surface 3*a* of the substrate 3, and a sealing resin member that seals the light emitting chips. The light emitting surface 80*a* of the low beam light source 80 is set as plane setting in the optical axis direction Z toward the projection lens 2. The "LED" is an abbreviation for a "Light Emitting Diode" and the "EL" is an abbreviation for an "Electro Luminescence".

The first reflector 81 and the second reflector 82 are light-impermeable reflector members, and are composed of resin members having reflective surfaces 81*a* and 82*a* with aluminum vapor deposition or silver coating, for example. The shape of each of the reflective surfaces 81*a* and 82*a* is a curved surface shape designed on the basis of a target optical path of the reflected light relative to incident light, such as a rotating ellipsoid and a free-form surface (NURBS surface) based on an ellipse, for example.

The first reflector 81 is located just in front of the low beam light source 80 in the optical axis direction Z and is disposed at such a position as not to block the emitted light from the high beam light source 90 directly toward the lens back surface 2*b* of the projection lens 2. The first reflector 81 reflects light from the low beam light source 80 and causes the reflected light to be directed toward and enter the reflective surface 82*a* of the second reflector 82.

The second reflector 82 is located diagonally above the high beam light source 90 in the optical axis direction Z and is disposed at such a position as not to block the emitted light from the high beam light source 90 toward the lens back surface 2*b* of the projection lens 2 directly. The second reflector 82 further reflects the reflected light from the first reflector 81 to make the reflected light enter the second lens area 22 of the projection lens 2.

Figure 4:
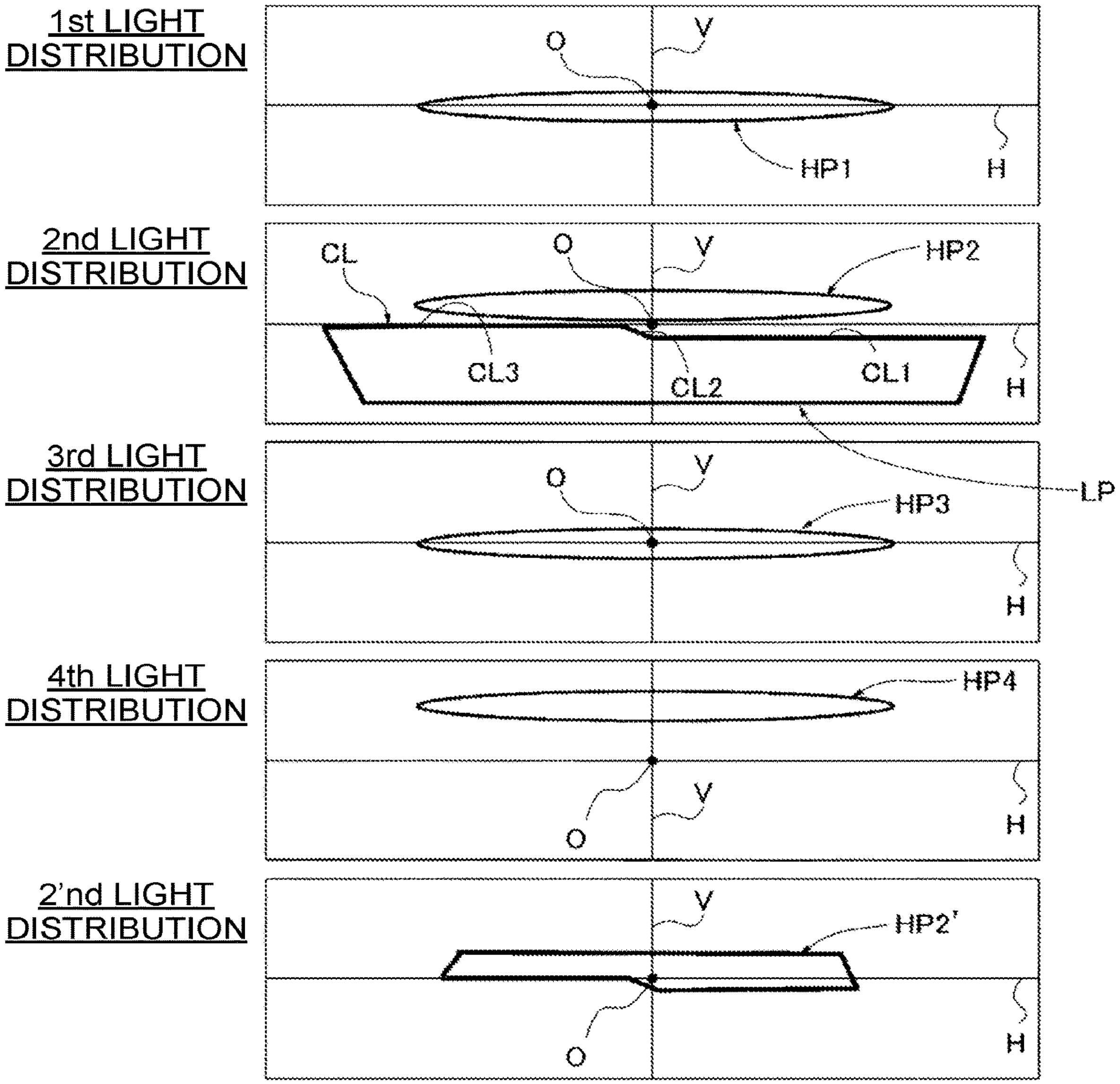
FIG. 4 is an explanatory diagram of light distribution action, illustrating an example of a light distribution for each area by light emitted from a lens front surface of each of a first lens area, a second lens area, a third lens area, and a fourth lens area in the headlight unit of the first embodiment.

The reflective surface 82*a* of the second reflector 82 is provided with a cutoff line reflective shape part 84 that forms the cutoff line CL of the low beam light distribution pattern LP near the low focal point F2 at a reflective surface lower end. As illustrated in FIG. 4, the cutoff line CL has the lower horizontal cutoff line CL1, the oblique cutoff line CL2, and the upper horizontal cutoff line CL3.

The high beam light source module 9 is a light source-side module that forms the high beam light distribution pattern HP by combining a light distribution for each area in the projection lens 2. The high beam light source module 9 has the high beam light source 90 and the reflective member 91.

The high beam light source 90 is disposed to face the projection lens 2, and is provided on the substrate 3 having the lens facing surface 3*a*. Herein, the "disposed to face" means to be disposed such that a surface orthogonal to the lens optical axis of the projection lens 2 and facing the lens back surface 2*b* is a light emitting surface 90*a* of the high beam light source 90. In other words, the high beam light source 90 is located above the low beam light source 80 and provided on the same plane as the lens facing surface 3*a* where the low beam light source 80 is provided. As the high beam light source 90, a semiconductor type light source (LED in this embodiment) is used, similar to the low beam light source 80. The high beam light source 90 has a plurality of light emitting chips provided side-by-side in the vehicle width direction on the lens facing surface 3*a* of the substrate 3, and a sealing resin member that seals the light emitting chips. Herein, the plurality of light emitting chips provided side by side in the vehicle width direction of the high beam light source 90 may be able to control turning on and off individually.

The light emitting surface 90*a* of the high beam light source 90 is set as plane setting in the optical axis direction Z toward the projection lens 2. The light emitting surface 90*a* is located below and behind the low focal point F2, and is disposed on the lens optical axis center line CA of the projection lens 2.

The reflective member 91 is located at a portion connecting a position of the low focal point F2 and a lens-side upper position of the high beam light source 90.

The reflective surface 91*a* of the reflective member 91 is located above and in front of the high beam light source 90 near the low focal point F2. The reflective surface 91*a* partially reflects the light emitted from the high beam light source 90 toward the second lens area 22 which is the low lens area of the projection lens 2. The reflective member 91 is composed of a resin member having the reflective surface 91*a* with aluminum vapor deposition or silver coating, for example.

Now, light distribution pattern formation action in the headlight unit 1 according to the first embodiment will be described with reference to FIG. 3 and FIG. 4. In the light distribution diagram for each area in FIG. 4, reference symbol V denotes an up-and-down-direction vertical, which passes through the center point O, and reference symbol H denotes a vehicle-width-direction-horizontal line, which passes through the center point O.

Figure 3:
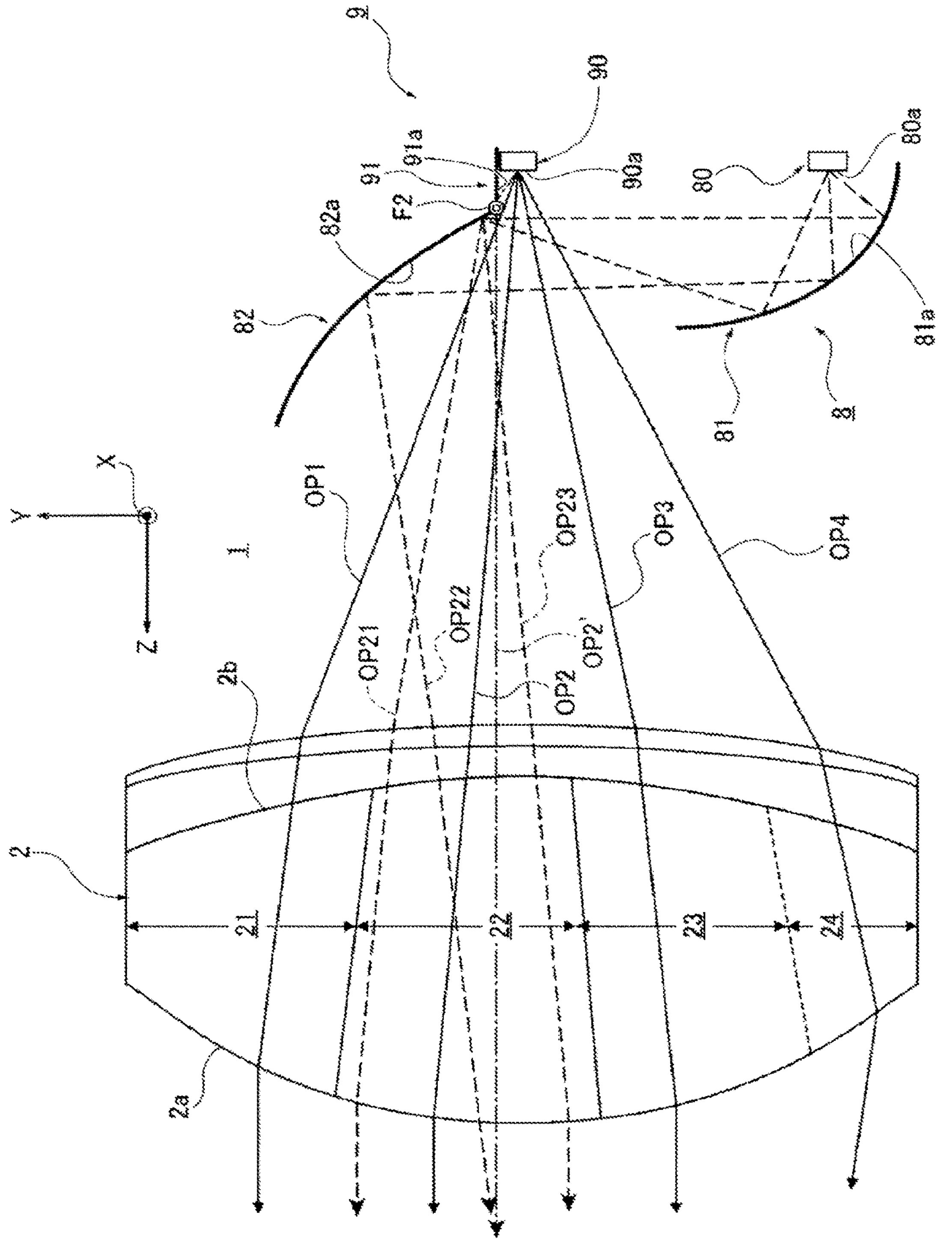
FIG. 3 is an explanatory diagram of light distribution action, illustrating optical paths from a low beam light source that forms a low beam light distribution pattern and optical paths from a high beam light source that forms high beam light distribution patterns in the headlight unit of the first embodiment.

When the low beam light source 80 is turned on, light emitted from the low beam light source 80 depicts optical paths OP21, OP22, and OP23 illustrated by the dashed lines in FIG. 3. That is, the light emitted from the low beam light source 80 is reflected by the first reflector 81, and the reflected light is reflected by the second reflector 82. The reflected light from the second reflector 82 then becomes the optical paths OP21, OP22, and OP23 to enter from the area back surface of the second lens area 22. At this time, the reflected light from the second reflector 82 has a reflected light shape corresponding to the shape of the reflective surface 82*a* of the second reflector 82 with the cutoff line reflective shape part 84.

Accordingly, when the low beam light source 80 is turned on, the low beam light distribution pattern LP with the cutoff line CL is formed by light beams emitted outward from the area front surface of the second lens area 22, as illustrated in the 2nd light distribution in FIG. 4.

When the high beam light source 90 is turned on, emitted light from the high beam light source 90 depicts optical paths OP1, OP2, OP3 and OP4 illustrated by solid lines in FIG. 3 and an optical path OP2' illustrated by a one-pointed chain line in FIG. 3. That is, the emitted light from the high beam light source 90 is directly incident on the respective area back surfaces of the lens areas 21, 22, 23 and 24 of the projection lens 2 by the optical paths OP1, OP2, OP3 and OP4.

When the light emitted from the high beam light source 90 is directly incident on the area back surface of the first lens area 21 via the optical path OP1, the center light distribution HP1 by the first lens area 21 is formed by the light beam emitted outward from the area front surface of the first lens area 21. The center light distribution HP1 is formed in the shape of a light distribution in which a center position is almost coincident with the center point O, as the illustrated in the 1st light distribution in FIG. 4.

When the light emitted from the high beam light source 90 is directly incident on the area back surface of the second lens area 22 via the optical path OP2, the upper part light distribution HP2 by the second lens area 22 is formed by the light beam emitted outward from the area front surface of the second lens area 22. The upper part light distribution HP2 is formed in the shape of a light distribution in which a center position is above the center point O, and a lower edge of the upper part light distribution HP2 is tangent to the horizontal line H, as illustrated in the 2nd light distribution in FIG. 4.

When the light emitted from the high beam light source 90 is directly incident on the area back surface of the third lens area 23 via the optical path OP3, the center light distribution HP3 by the third lens area 23 is formed by the light beam emitted outward from the area front surface of the third lens area 23. The center light distribution HP3 is formed in the shape of a light distribution in which a center position is almost coincident with the center point O, as illustrated in the 3rd light distribution in FIG. 4. In the 1st light distribution and the 3rd light distribution in FIG. 4, the center light distribution HP1 and the center light distribution HP3 are almost at the same position and have the same shape. However, the center light distributions HP1 and HP3 may be slightly shifted in one or both positions in the direction of the up-and-down-direction vertical line V, or the shape of one or both may be slightly changed to properly adjust the illumination intensity distribution of the high beam light distribution pattern HP. The amount of slight shifting of each of the center light distributions HP1 and HP3 and the slight shape change are the amount change and the shape change determined on the basis of appropriate adjustment of the illumination intensity distribution of the high beam light distribution pattern HP.

When the light emitted from the high beam light source 90 is directly incident on the area back surface of the fourth lens area 24 via the optical path OP4, the upper light distribution HP4 by the fourth lens area 24 is formed by the light beam emitted outward from the area front surface of the fourth lens area 24. The upper light distribution HP4 is formed in the shape of an area light distribution by a flat elliptical shape in which a center position is above the center point O, and a lower edge is separated from the horizontal line H, as illustrated in the 4th light distribution. Herein, the upper light distribution HP4 may be an area light distribution in which the lower edge is tangent to the upper part light distribution HP2. Or, the upper light distribution HP4 may be an area light distribution in which the lower edge slightly overlaps the upper part light distribution HP2.

When the light emitted from the high beam light source 90 is partially incident on and reflected by the reflective surface 91*a* of the reflective member 91, the reflected light from the vicinity of the low focal point F2 is incident on the area back surface of the second lens area 22 via the optical path OP2'. At this time, the light beam emitted outward from the area front surface of the second lens area 22 forms the additional light distribution HP2' by the second lens area 22. The additional light distribution HP2' is formed in the shape of a light distribution which is tangent to the cutoff line CL of the low beam light distribution pattern LP, as illustrated in the 2'nd light distribution in FIG. 4.

Therefore, the high beam light distribution pattern HP caused by turning on the high beam light source 90 is a light distribution pattern obtained by combining the center light distribution HP1, the upper part light distribution HP2, the center light distribution HP3, the upper light distribution HP4, and the additional light distribution HP2' which are light distributions for the respective areas.

Now, effects of a feature configuration of the headlight unit 1 according to the first embodiment will be described.

The headlight unit 1 of the first embodiment includes the projection lens 2, the low beam light source module 8, and the high beam light source module 9. The projection lens 2 is divided into the plurality of lens areas 21, 22, 23 and 24, each of which has the different focal point position where parallel light incident from the lens front surface 2*a* is converged. The second lens area 22, one of the plurality of lens areas 21, 22, 23 and 24, is defined as the low lens area with the low focal point F2. The low beam light source module 8 has the low beam light source 80, the first reflector 81, and the second reflector 82. The low beam light source module 8 is set such that reflected light from the first reflector 81 and the second reflector 82 which reflect emitted light from the low beam light source 80 is incident on the back surface of the second lens area 22, and the low beam light distribution is emitted from the area front surface. The high beam light source module 9 has the high beam light source 90. The high beam light source module 9 is set such that emitted light from the high beam light source 90 is directly incident on the lens back surface 2*b* of the projection lens 2, and the high beam light distribution for each area is emitted from each of a plurality of area front surfaces.

That is, the low beam light distribution pattern LP is formed by the low beam light distribution emitted outward from the area front surface of the second lens area 22. On the other hand, the high beam light distribution pattern HP is formed by combination of overlapping the high beam light distribution for each area emitted outward from the area front surface of each of the plurality of lens areas 21, 22, 23 and 24 of the projection lens 2. Thus, the low beam light distribution from the second lens area 22 of the projection lens 2 overlaps and is incorporated into the respective high beam light distributions from the plurality of lens areas 21, 22, 23 and 24 of the projection lens 2. Therefore, connection between the high beam light distribution and the low beam light distribution is improved, and occurrence of a dark area between the high beam light distribution pattern HP and the low beam light distribution pattern LP is suppressed.

Accordingly, it is possible to provide the headlight unit 1 that forms a travel light distribution pattern in which the occurrence of the dark area between the low beam light distribution and the high beam light distribution is suppressed in the lamp provided with the projection lens 2 that is shared by two light sources.

In the first embodiment, the projection lens 2 is divided into at least the first lens area 21, the second lens area 22, and the third lens area 23 from a top as the plurality of high lens areas where the emitted light from the high beam light source 90 is directly incident. The second lens area 22 of the projection lens 2 is the low lens area where the reflected light from each the first reflector 81 and the second reflector 82 is incident.

That is, the center light distribution HP1 by the first lens area 21, the upper part light distribution HP2 by the second lens area 22, the center light distribution HP3 by the third lens area 23 are combined, so that the high beam light distribution pattern HP is formed. On the other hand, the second lens area 22 interposed between the first lens area 21 and the third lens area 23 forms the low beam light distribution pattern LP with the cutoff line CL. Therefore, the center light distribution HP1 by the first lens area 21 and the center light distribution HP3 by the third lens area 23 are formed by positional relationship in which the low beam light distribution pattern LP is interposed between the center light distributions HP1 and HP3 from above and below. Therefore, the illumination intensity of an area near the cutoff line CL of the low beam light distribution pattern LP can be made higher by the center light distribution HP1 by the first lens area 21 and the center light distribution HP3 by the third lens area 23. Accordingly, it is possible to easily secure good connection between the high beam light distribution pattern HP and the cutoff line CL of the low beam light distribution pattern LP, and suppress spectrum near the cutoff line CL.

In the first embodiment, in the projection lens 2, an area further below the third lens area 23 is the fourth lens area 24 that forms the upper light distribution HP4 of the high beam light distribution pattern HP.

That is, the fourth lens area 24 which forms the upper light distribution HP4 of the high beam light distribution pattern HP is disposed at a lens lower part of the projection lens 2. Accordingly, a light cone can be prevented from expanding in the vicinity of the projection lens 2 compared to a case where a high beam light distribution pattern including an upper light distribution is formed by the entire lens.

In the first embodiment, in the high beam light source 90, the light emitting surface 90*a* facing the lens back surface 2*b* of the projection lens 2 is located below and behind the low focal point F2, and is disposed on the lens optical axis center line CA of the projection lens 2.

That is, the emitted light from the high beam light source 90 is directly incident on the lens back surface 2*b* of the projection lens 2. Therefore, when the light from the high beam light source 90 enters each of the plurality of lens areas 21, 22, 23 and 24 of the projection lens 2, the angle of incidence to the lens surface can be kept within an angle range of an about right angle. Accordingly, a stable high beam light distribution pattern HP can be formed by combination of the respective high beam light distributions emitted from the plurality of area front surfaces of the projection lens 2. In particular, when the light from the high beam light source 90 directly enters and passes through the first lens area 21 and the second lens area 22 of the projection lens 2, the luminous intensity near both the lens areas 21 and 22 increases, so that it is possible to improve the recognizability of a distant sign, a pedestrian, or the like.

In the first embodiment, the high beam light source module 9 includes the reflective member 91 disposed above and in front of the high beam light source 90, and having the reflective surface 91*a* which reflects the light emitted from the high beam light source 90 toward the second lens area 22.

That is, of the light emitted from the high beam light source 90, light excluded from the light incident on the lens back surface 2*b* of the projection lens 2 is partially received by the reflective surface 91*a* of the reflective member 91. The reflected light from the reflective surface 91*a* then forms the additional light distribution HP2' of the high beam light distribution pattern HP. Therefore, the additional light distribution HP2' becomes a light distribution tangent to the cutoff line CL of the low beam light distribution pattern LP. Accordingly, the additional light distribution HP2' of the high beam light distribution pattern HP is formed by effectively utilizing the light emitted from the high beam light source 90, so that it is possible to increase the illumination intensity of a part that becomes the dark area in the travel light distribution pattern.

In the first embodiment, the first reflector 81 and the second reflector 82 are provided as the reflector provided in the low beam light source module 8. The high beam light source 90 is disposed to face the projection lens 2, and is provided on the substrate 3 having the lens facing surface 3*a*. The low beam light source 80 is located below the high beam light source 90 and provided on the same plane as the lens facing surface 3*a*. The first reflector 81 and the second reflector 82 are each disposed at such a position as not to block the emitted light from the high beam light source 90 directly toward the lens back surface 2*b* of the projection lens 2.

That is, when the low beam light source 80, the first reflector 81, and the second reflector 82 provided in the low beam light source module 8 are disposed, the low beam light source 80 is disposed in the same plane position as the high beam light source 90. The first reflector 81 and the second reflector 82 are disposed on the projection lens 2 side with respect to the high beam light source 90 without blocking the light emitted from the high beam light source 90. Therefore, the low beam light source module 8 having the low beam light source 80, the first reflector 81, and the second reflector 82 can be disposed between the lens back surface 2*b* of the projection lens 2 and the lens facing surface 3*a* of the substrate 3. Accordingly, the dimensions of the headlight unit 1 in the optical axis direction Z can be kept short and the headlight unit 1 can be made compact.

Second Embodiment

A second embodiment is an example of a headlight unit 10 in which a low beam light source module 8' is disposed at a different position from the low beam light source module 8 of the first embodiment.

Now, a configuration of the headlight unit 10 according to the second embodiment will be described with reference to FIG. 5.

Figure 5:
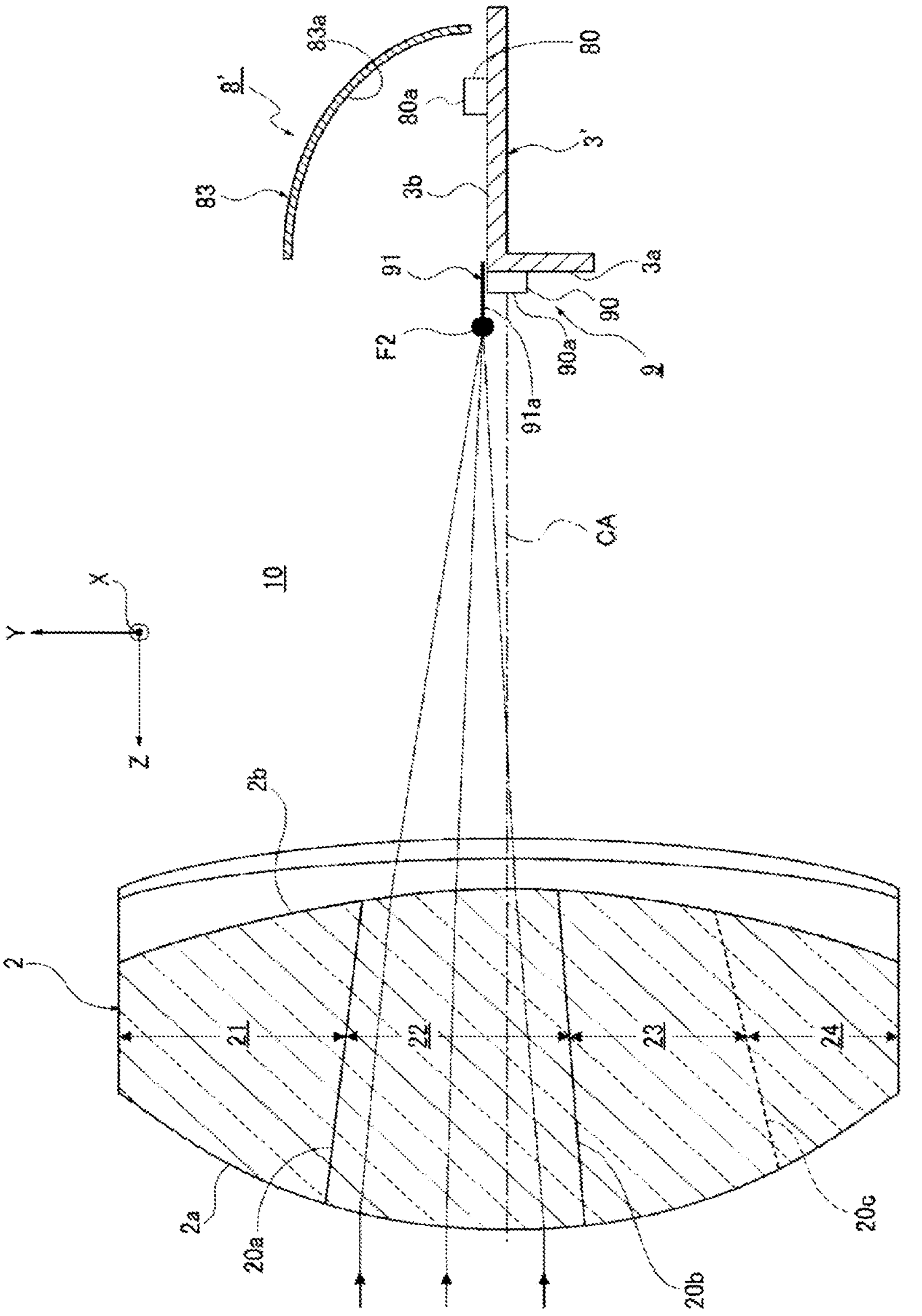
FIG. 5 is a longitudinal sectional view illustrating a configuration of a projection lens, a low beam light source module, and a high beam light source module of a headlight unit of a second embodiment.

As illustrated in FIG. 5, the headlight unit 10 includes a projection lens 2, the low beam light source module 8', and a high beam light source module 9.

The low beam light source module 8' has a low beam light source 80 and a third reflector 83.

The low beam light source 80 is provided on a lens optical axis surface 3*b* of a substrate 3' having the lens facing surface 3*a* and a lens optical axis surface 3*b* behind a high beam light source 90. The third reflector 83 has a similar configuration to the second reflector 82 of the first embodiment, and has a reflective surface 83*a*. The third reflector 83 is disposed at such a position as to face a light emitting surface 80*a* of the low beam light source 80, and not to block emitted light from the high beam light source 90 directly toward a lens back surface 2*b* of the projection lens 2.

The high beam light source module 9 has the high beam light source 90 and the reflective member 91.

The high beam light source 90 is provided on the lens facing surface 3*a* of the substrate 3' having the lens facing surface 3*a* and the lens optical axis surface 3*b*. A reflective member 91 has a reflective surface 91*a* similar to the first embodiment. The projection lens 2 will not be described, since the projection lens 2 has a similar configuration to the first embodiment. Among the configurations of the low beam light source module 8' and the high beam light source module 9, configurations other than those described above are similar to those in the first embodiment and therefore will not be described.

Now, formation action of a low beam light distribution pattern LP in the headlight unit 10 according to the second embodiment will be described with reference to FIG. 6.

Figure 6:
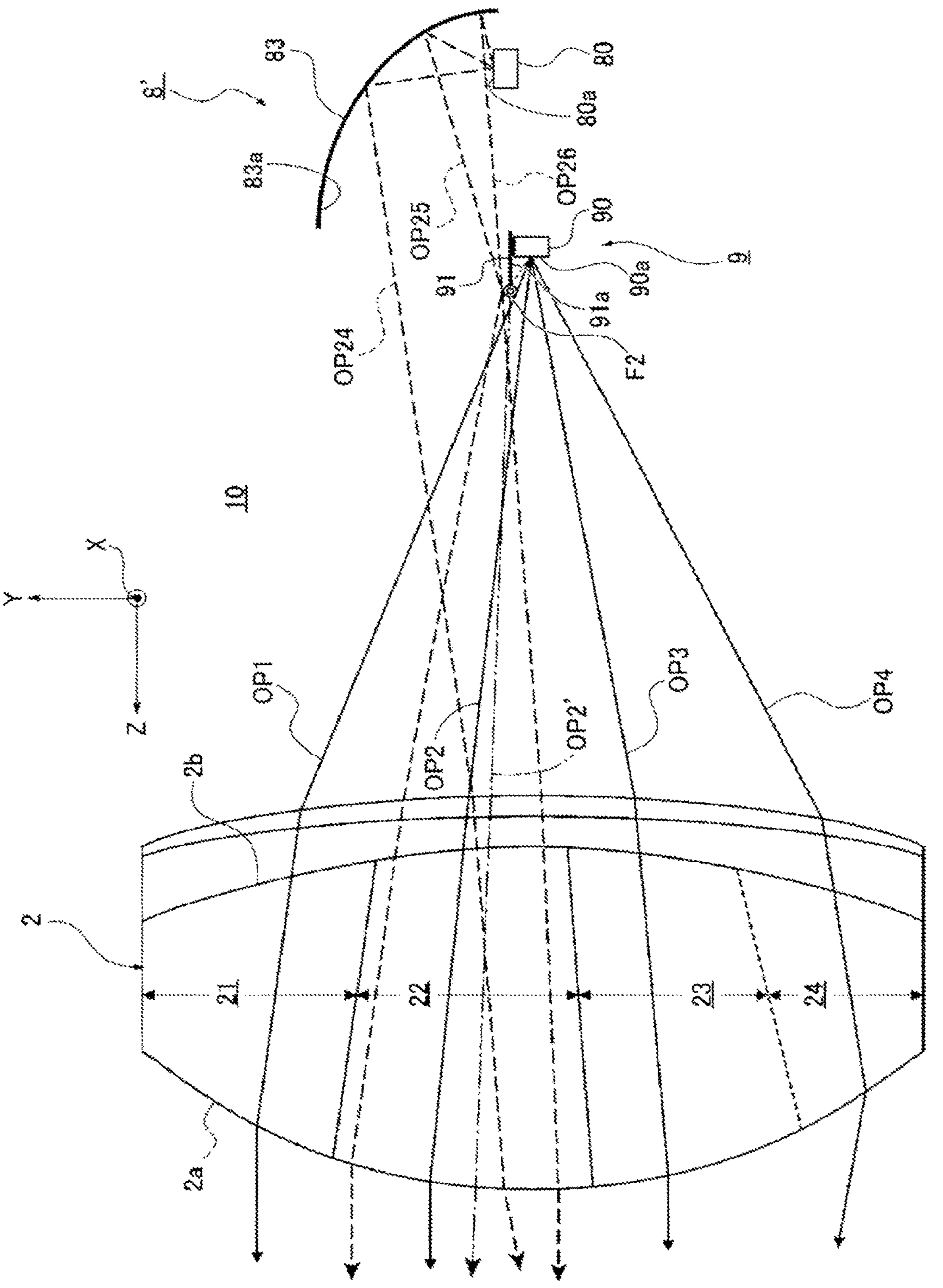
FIG. 6 is an explanatory diagram of light distribution action, illustrating optical paths from a low beam light source that forms a low beam light distribution pattern and optical paths from a high beam light source that forms high beam light distribution patterns in the headlight unit of the second embodiment.

When the low beam light source 80 is turned on, light emitted from the low beam light source 80 depicts optical paths OP24, OP25 and OP26 illustrated by dashed lines in FIG. 6. That is, the emitted light from the low beam light source 80 is reflected by the reflective surface 83*a* of the third reflector 83. The reflected light from the third reflector 83 then becomes the optical paths OP24, OP25 and OP26 to enter from an area back surface of a second lens area 22. At this time, a cutoff line is formed by setting of the shape of the reflective surface 83*a* of the third reflector 83 or other factors.

Accordingly, when the low beam light source 80 is turned on, the low beam light distribution pattern LP with the cutoff line CL is formed by light beams emitted outward from the area front surface of the second lens area 22, as illustrated in the 2nd light distribution in FIG. 4. The formation action of the high beam light distribution pattern HP will not be described since the formation action is similar to that of first embodiment.

Now, effects of a feature configuration of the headlight unit 10 according to the second embodiment will be described.

In the second embodiment, a third reflector 83 is provided as a reflector provided in the low beam light source module 8'. The high beam light source 90 is provided on the lens facing surface 3*a* of the substrate 3' having the lens facing surface 3*a* and the lens optical axis surface 3*b*. A low beam light source 80 is provided on the lens optical axis surface 3*b* of the substrate 3' behind the high beam light source 90. The third reflector 83 is disposed at such a position as to face a light emitting surface 80*a* of the low beam light source 80, and not to block emitted light from the high beam light source 90 directly toward a lens back surface 2*b* of a projection lens 2.

That is, when the low beam light source 80 and the third reflector 83 provided in the low beam light source module 8' are disposed, the low beam light source 80 is disposed behind the high beam light source 90 with the light emitting surface 80*a* facing upward. The third reflector 83 is disposed at an upper position of the low beam light source 80, which does not block the light emitted from the high beam light source 90. Therefore, the low beam light source module 8' and the high beam light source module 9 can be disposed in a narrow space area in the up and down direction behind the projection lens 2. Accordingly, the dimensions of the headlight unit 1 in the up and down direction Y can be kept short and the headlight unit 1 can be made compact.

Thus, the vehicle lamp of the present disclosure is described on the basis of the first embodiment and the second embodiment, but the specific configuration is not limited to these embodiments, and design changes, additions, or the like are permitted as long as the design changes, additions, or the like do not depart from the gist of the invention claimed in each claim.

In each of the first and second embodiments, the projection lens 2 is divided into four areas, namely, the first lens area 21, the second lens area 22, the third lens area 23, and the fourth lens area 24. However, as long as the projection lens is divided into two or more multiple lens areas, the present disclosure is not limited to four area division. An example of three or more lens area division capable of interposing a low lens area between high lens areas from above and below is preferable.

In each of the first and second embodiments, the light emitting surface 90*a* of the high beam light source 90 is disposed on the lens optical axis center line CA of the projection lens 2. However, the light emitting surface of the high beam light source may be disposed at such a position as to shift in the up and down direction from the lens optical axis center line of the projection lens.

In each of the first and second embodiments, the projection lens 2 is divided such that the area further below the third lens area 23 is the fourth lens area 24 that forms the upper light distribution HP4 of the high beam light distribution pattern HP. However, in the projection lens, a lower area obtained when the third lens area is divided into an upper part and a lower part may be a fourth lens area that forms an upper light distribution of the high beam light distribution pattern.

DESCRIPTION OF REFERENCE NUMERALS

1 headlight unit (vehicle lamp)
2 projection lens
2*a* lens front surface
2*b* lens back surface
21 first lens area
22 second lens area (low lens area)
23 third lens area
24 fourth lens area
3, 3' substrate
3*a* lens facing surface
3*b* lens optical axis surface
8 low beam light source module
80 low beam light source
80*a* light emitting surface
81 first reflector (reflector)
82 second reflector (reflector)
83 third reflector (reflector)
84 cutoff line reflective shape part
9 high beam light source module
90 high beam light source
90*a* light emitting surface
91 reflective member
91*a* reflective surface
F2 low focal point
LP low beam light distribution pattern
CL cutoff line
HP high beam light distribution pattern
HP1 center light distribution HP2 upper part light distribution
HP3 center light distribution
HP4 upper light distribution
HP2' additional light distribution
CA lens optical axis center line

The invention claimed is:

1. A vehicle lamp comprising:
a projection lens;
a low beam light source module; and
a high beam light source module, wherein
the projection lens is divided into a plurality of lens areas, each of which has a different focal point position, and one of the plurality of lens areas is a low lens area with a focal point where parallel light incident from a front surface of the projection lens is converged,
the low beam light source module has a low beam light source and a reflector which reflects emitted light from the low beam light source, and is set such that reflected light from the reflector is incident on a back surface of the low lens area, and a low beam light distribution is emitted from an area front surface, and
the high beam light source module has a high beam light source, and is set such that emitted light from the high beam light source is directly incident on a lens back surface of the projection lens, and a high beam light distribution for each of the plurality of lens areas is emitted from each of a plurality of area front surfaces,
wherein the projection lens is divided into at least a first lens area, a second lens area, and a third lens area from a top as a plurality of high lens areas where the emitted light from the high beam light source is directly incident, and
the second lens area of the projection lens is the low lens area where the reflected light from the reflector is incident, and
wherein
in the projection lens, an area further below the third lens area, or a lower area obtained when the third lens area is divided into an upper part and a lower part is a fourth lens area that forms an upper light distribution of a high beam light distribution pattern.

2. The vehicle lamp according to claim 1, wherein
the high beam light source module includes a reflective member disposed above and in front of the high beam light source, and having a reflective surface which reflects the emitted light from the high beam light source toward the low lens area.

3. The vehicle lamp according to claim 1, wherein
the high beam light source is provided on a lens facing surface of a substrate, the substrate having the lens facing surface and a lens optical axis surface,
the low beam light source is provided on the lens optical axis surface of the substrate behind the high beam light source, and
the reflector is disposed at such a position as to face a light emitting surface of the low beam light source, and not to block the emitted light from the high beam light source directly toward the lens back surface of the projection lens.

4. The vehicle lamp according to claim 1, wherein
in the high beam light source, a light emitting surface facing the lens back surface of the projection lens is located below and behind the focal point of the low lens area, and is disposed on a lens optical axis center line of the projection lens.

5. The vehicle lamp according to claim 1, comprising:
wherein the reflector provided in the low beam light source module includes a first reflector and a second reflector,
the high beam light source is disposed to face the projection lens, and is provided on a substrate having a lens facing surface,
the low beam light source is located below the high beam light source and provided on the same plane as the lens facing surface, and
the first reflector and the second reflector are each disposed at such a position as not to block the emitted light from the high beam light source directly toward the lens back surface of the projection lens.

6. A vehicle lamp comprising:
a projection lens;
a low beam light source module; and
a high beam light source module, wherein
the projection lens is divided into a plurality of lens areas, each of which has a different focal point position, and one of the plurality of lens areas is a low lens area with a focal point where parallel light incident from a front surface of the projection lens is converged,
the low beam light source module has a low beam light source and a reflector which reflects emitted light from the low beam light source, and is set such that reflected light from the reflector is incident on a back surface of the low lens area, and a low beam light distribution is emitted from an area front surface, and
the high beam light source module has a high beam light source, and is set such that emitted light from the high beam light source is directly incident on a lens back surface of the projection lens, and a high beam light distribution for each of the plurality of lens areas is emitted from each of a plurality of area front surfaces,
wherein
in the high beam light source, a light emitting surface facing the lens back surface of the projection lens is located below and behind the focal point of the low lens area, and is disposed on a lens optical axis center line of the projection lens.

7. The vehicle lamp according to claim 6, wherein
the projection lens is divided into at least a first lens area, a second lens area, and a third lens area from a top as a plurality of high lens areas where the emitted light from the high beam light source is directly incident, and
the second lens area of the projection lens is the low lens area where the reflected light from the reflector is incident.

8. The vehicle lamp according to claim 3, wherein
in the projection lens, an area further below the third lens area, or a lower area obtained when the third lens area is divided into an upper part and a lower part is a fourth lens area that forms an upper light distribution of a high beam light distribution pattern.

9. The vehicle lamp according to claim 6, wherein
the high beam light source module includes a reflective member disposed above and in front of the high beam light source, and having a reflective surface which reflects the emitted light from the high beam light source toward the low lens area.

10. The vehicle lamp according to claim 6, comprising:
wherein the reflector provided in the low beam light source module includes a first reflector and a second reflector,
the high beam light source is disposed to face the projection lens, and is provided on a substrate having a lens facing surface, the low beam light source is located below the high beam light source and provided on the same plane as the lens facing surface, and the first reflector and the second reflector are each disposed at such a position as not to block the emitted light from the high beam light source directly toward the lens back surface of the projection lens.

11. The vehicle lamp according to claim 6, wherein the high beam light source is provided on a lens facing surface of a substrate, the substrate having the lens facing surface and a lens optical axis surface, the low beam light source is provided on the lens optical axis surface of the substrate behind the high beam light source, and the reflector is disposed at such a position as to face a light emitting surface of the low beam light source, and not to block the emitted light from the high beam light source directly toward the lens back surface of the projection lens.

12. A vehicle lamp comprising:

a projection lens;

a low beam light source module; and a high beam light source module, wherein the projection lens is divided into a plurality of lens areas, each of which has a different focal point position, and one of the plurality of lens areas is a low lens area with a focal point where parallel light incident from a front surface of the projection lens is converged, the low beam light source module has a low beam light source and a reflector which reflects emitted light from the low beam light source, and is set such that reflected light from the reflector is incident on a back surface of the low lens area, and a low beam light distribution is emitted from an area front surface, the high beam light source module has a high beam light source, and is set such that emitted light from the high beam light source is directly incident on a lens back surface of the projection lens, and a high beam light distribution for each of the plurality of lens areas is emitted from each of a plurality of area front surfaces, and wherein the reflector provided in the low beam light source module includes a first reflector and a second reflector, the high beam light source is disposed to face the projection lens, and is provided on a substrate having a lens facing surface, the low beam light source is located below the high beam light source and provided on the same plane as the lens facing surface, and the first reflector and the second reflector are each disposed at such a position as not to block the emitted light from the high beam light source directly toward the lens back surface of the projection lens.

13. The vehicle lamp according to claim 12, wherein the projection lens is divided into at least a first lens area, a second lens area, and a third lens area from a top as a plurality of high lens areas where the emitted light from the high beam light source is directly incident, and the second lens area of the projection lens is the low lens area where the reflected light from the reflector is incident.

14. The vehicle lamp according to claim 13, wherein in the projection lens, an area further below the third lens area, or a lower area obtained when the third lens area is divided into an upper part and a lower part is a fourth lens area that forms an upper light distribution of a high beam light distribution pattern.

15. The vehicle lamp according to claim 12, wherein in the high beam light source, a light emitting surface facing the lens back surface of the projection lens is located below and behind the focal point of the low lens area, and is disposed on a lens optical axis center line of the projection lens.

16. The vehicle lamp according to claim 12, wherein the high beam light source module includes a reflective member disposed above and in front of the high beam light source, and having a reflective surface which reflects the emitted light from the high beam light source toward the low lens area.

* * * * *